June 2, 1953  E. J. VAILLANCOURT  2,640,265
ARTIFICIAL DENTURE AND METHOD OF MANUFACTURE
Filed Oct. 30, 1948

INVENTOR.
Eugene J. Vaillancourt
BY Owen W. Kennedy

Patented June 2, 1953

2,640,265

UNITED STATES PATENT OFFICE 2,640,265

ARTIFICIAL DENTURE AND METHOD OF MANUFACTURE

Eugene J. Vaillancourt, Fitchburg, Mass.

Application October 30, 1948, Serial No. 57,580

4 Claims. (Cl. 32—2)

The present invention relates to an improved method of and apparatus for mounting artificial teeth, in such manner that the teeth may be readily set up in conveniently handled groups, for the purpose of trying out the teeth in the mouth, preparatory to incorporating them in a denture.

In Patent No. 2,229,780, issued to me on January 28, 1941, there is shown and described a procedure for mounting artificial teeth, which involves placing a predetermined number of teeth in a matrix having recesses corresponding in number and form to a set of upper or lower teeth. After the desired number of individual teeth have been placed in the matrix, selected groups of the teeth are secured directly to each other, as by means of wax, so that the connected groups of teeth may then be removed from the matrix, as units, and thereafter mounted, as units, in an articulator of the type usually employed by dentists and dental technicians. This procedure enables a try-in to be completed with a minimum number of operations, due to the fact that the connected groups of teeth are handled in sections, as compared to previous procedures which required laborious setting of the teeth one-by-one.

The object of the present invention is to provide an improved method of and apparatus for carrying on the general procedure disclosed in my aforesaid patent, in such a manner as to result in a further saving of time and labor on the part of the manufacturer of the teeth, as well as on the part of the dentist or dental technician using the teeth. Furthermore, the individual groups, or sections, of connected teeth resulting from practice of the present invention, are capable of being handled after their manufacture, and used in the completion of try-ins, without any possibility of such handling and use resulting in any alteration in the relative position between teeth of a given group, such as would change the bite or occlusion between sets of upper or lower teeth.

Briefly stated, the present invention resides in the production of groups of teeth that are connected together by a material similar to that of which the teeth are composed, with the number of teeth in each group ranging from a full set of upper or lower teeth, to any desired portion of a set. The present invention also contemplates the production of complete or partial dentures, for use in the mouth, made of a material similar to the material employed for the teeth mounted on the denture, as well as the material connecting the teeth in the desired groups, with the resulting denture having all its constituent parts attached together by the inherent adhesiveness of the material itself, so that the denture provides a substantially homogeneous assembly of teeth, connections therebetween, and the plate portion which fits in the mouth.

The above and other advantageous features of the invention will hereinafter more fully appear from the following description, when considered in connection with the accompanying drawings, in which—

Figure 1:
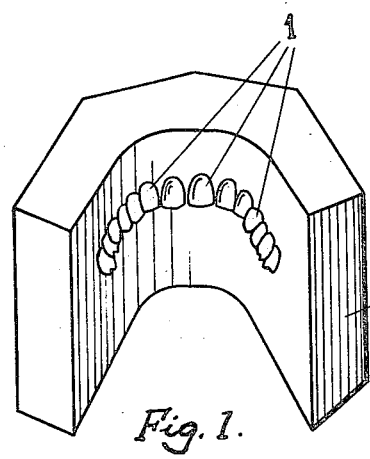
Fig. 1 is a perspective view of one portion of a molding die for producing groups of connected teeth in accordance with the present invention.
Figure 2:
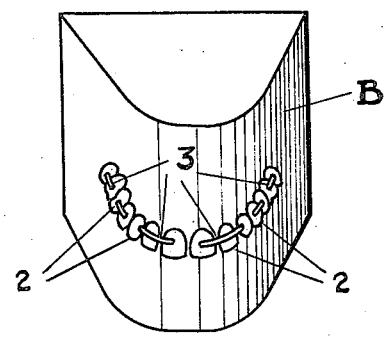
Fig. 2 is a perspective view of a second portion of a molding die for producing groups of connected teeth in cooperation with the molding die portion of Fig. 1.

Referring to the drawings, there is shown in Fig. 1, a molding die A providing a series of molding cavities 1 so formed as to produce individual teeth differing in size and shape, in accordance with the variations of teeth in the human mouth, the die A being shown, for purposes of illustration, as capable of producing a full set of upper teeth. The die A is adapted to be used in cooperation with a second die B, which is shown in Fig. 2 as providing molding cavities 2 adapted to register with the cavities 1 of die A when the dies A and B are closed, preparatory to the molding operation. It is to be noted that the cavities 1 of the die A are adapted to form the fronts of the teeth that are to be cast therein, while the cavities 2 in the die B are adapted to form the rear portions of the teeth, so that the completed teeth can be readily removed from one or the other of the dies upon opening of the dies after performance of the molding operation.

As previously pointed out, the present invention contemplates the provision of groups of teeth connected directly to each other by material similar to the material from which the teeth are made, and one way of accomplishing this result is by providing the molding die B with a groove 3 of sufficient length to connect two or more molding cavities 2. As shown, the die B provides a number of such grooves 3 so as to connect together only certain molding cavities 2, with the arrangement of grooves 3 being such as to produce the several groups of connected teeth illustrated in Fig. 6.

In the production of teeth from the molding dies A and B, the molding cavities 1 and 2, and the grooves 3, are filled with a plastic heat-reactive molding compound of a character suitable for the production of artificial teeth. Such molding compounds usually come in the form of a powder that is mixed with a suitable liquid polymer to form a mass of putty-like consistency which can be readily pressed into the cavities of the molding dies A and B. When the molding cavities 1 and 2, and the connecting grooves 3, have been filled with the molding compound, the dies A and B are closed and subjected to heat of a degree sufficient to cause curing and setting of the plastic molding compound within the molding cavities. Upon completion of the molding operation, the dies A and B are opened, thereby exposing the teeth T that have been formed in the molding cavities 1 and 2.

As previously pointed out, certain of the molding cavities 2 in the die B are connected by the grooves 3, so that the particular teeth T that are molded within two or more connected cavities, are joined together by a rib 4 composed of the same material as the teeth T. Each rib 4 has relatively small cross section, as compared to the cross section of the teeth which it joins, with the rib 4 being entirely disposed at the rear of the connected teeth T and above the cutting edges, or grinding surfaces, of the teeth. The several groups of molded teeth T, as joined together by the ribs 4, may be readily removed from the molding dies A and B, as individual units, and thereafter handled and utilized as individual units in the making of various types of dentures for use in the mouth, as will next be described.

Figure 3:
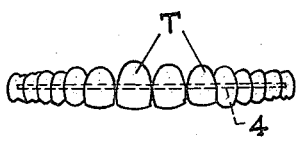
Fig. 3 is a front view of a group of connected teeth for providing a full set of upper teeth in a denture.
Figure 4:
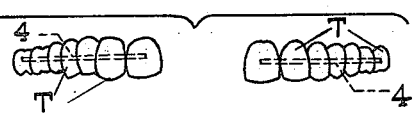
Fig. 4 is a front view of right and left-hand groups of connected teeth for combining together in a denture to provide a full set.
Figure 5:
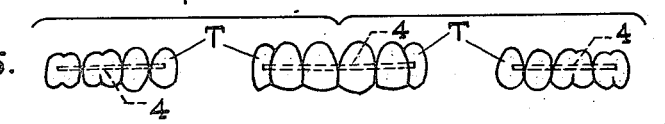
Fig. 5 is a front view of groups of connected teeth for combining together the anterior and posterior teeth of a full set.
Figure 6:
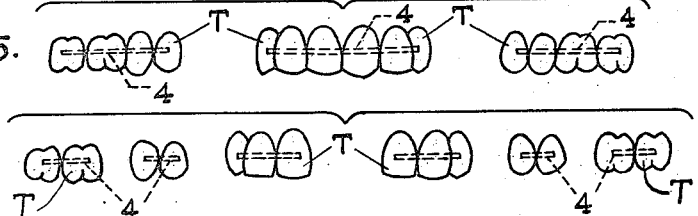
Fig. 6 is a front view of several different groups of connected teeth for selective use in a denture, to provide the desired number of artificial teeth.

Fig. 6 shows a number of groups of connected teeth T arranged in different combinations that would be suitable for convenient use in an articulator, in completing the try-ins for different sizes of dentures. With the particular groupings shown in Fig. 6, the posterior teeth are shown connected in pairs, while the anterior teeth are shown connected in threes. Obviously, the grouping of the connected teeth may be varied as may be desired; for example, Fig. 5 shows all the anterior teeth connected together, with the posterior teeth in fours, Fig. 4 shows a full set of upper teeth connected to provide complete right-hand and left-hand sections, each containing seven connected teeth, while Fig. 3 shows a full set of upper teeth connected together as one complete section containing fourteen teeth.

In practicing the present method, the manufacturer of artificial teeth would be provided with a number of pairs of molding dies, such as are shown in Figs. 1 and 2, for the production of the various sizes of teeth which he desires to make. That is to say, the molding dies A would vary only as to differences in sizes of the completed sets of teeth to be molded, while the dies B would vary as to the lengths of the grooves 3 connecting the cavities 2, to meet the requirements of the manufacturer as to the different groups of connected teeth which he desires to make and to distribute. Under all conditions, the net result of using any given pair of molding dies A and B, is to produce one or more groups of teeth T integrally connected by ribs 4 of the same material of which the teeth are made, which groups are ready for distribution in the dental trade in any one of the several forms illustrated in Figs. 3, 4 and 5.

Figure 7:
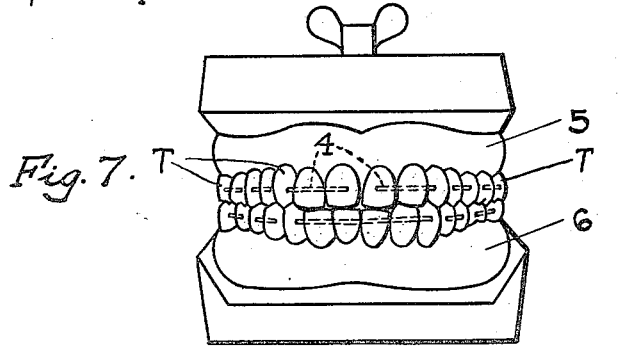
Fig. 7 is a front elevational view of an articulator with plaster models of the upper and lower mouth in position, and each provided with groups of connected teeth which have been mounted in separate sections therein, preparatory to producing a denture in accordance with the present invention.

After the teeth have been received from the manufacturer, the dentist, or dental technician, is then prepared to mount, or set up, the teeth in the desired sections, by employing them with a dental articulator of conventional form such as is shown in Fig. 7. Such an articulator provides wax bases 5 and 6 for receiving sets of upper and lower teeth, and each wax base 5 or 6 is prepared from a plaster cast of the mouth in which the denture, resulting from the practice of my invention, is to be used. In practice, each wax base 5 or 6 provides an excess of wax along the gum portion, and in carrying out my improved method, the dentist or dental technician selects from his supply of connected tooth sections the proper teeth to meet the requirements of the denture being made, and places them in the articulator by embedding them in the excess wax along the gum portion of either base 5 or 6. By selecting the proper tooth groups, or sections, to meet the situation, it is possible to complete the try-in with a minimum number of operations, with each group, or section, of connected teeth being held in place on its wax base by manipulation of the excess wax until the proper occulusion is obtained between the two sets of teeth as mounted on the bases 5 and 6. Thus, it is possible to complete the try-in for use in the mouth, with a minimum number of operations, as compared to the previous practice of setting teeth one-by-one in an articulator, with the assurance that the connected teeth of any group will always be held in proper relation to each other, when once the group has been mounted in the wax base of an articulator.

Figure 8:
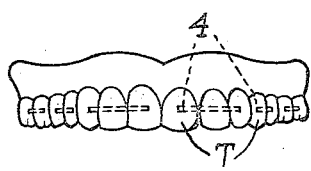
Fig. 8 is a front view of a denture for a full set of upper teeth made in accordance with the present invention.

The next step of preparing a complete denture, consists in utilizing each wax base 5 or 6, with the groups of teeth embedded therein, as a pattern for the formation of a mold suitable for the production of the complete denture. Such a mold is made by surrounding the assembly of a wax base with the teeth mounted thereon, in a suitable mold material, such as plaster of Paris, with the mold material being allowed to set and harden before being subjected to heat. Such heating of the mold and the pattern therein, causes the wax comprising the base, to melt out of the mold, with the previously embedded teeth then being held by the grip of the hardened mold material. The space within the mold previously occupied by the wax base, is then filled with a plastic composition having the same chemical characteristics as the plastic composition of which the teeth and their connecting ribs are made, although of a different color. This plastic composition, therefore, engages all those portions of the teeth and their connecting ribs previously engaged by the expended wax base, so that upon heating and curing of the plastic material, complete adhesion between the material and the teeth is obtained. The complete denture which results from a practice of the above described procedure is, therefore, a homogeneous assembly of teeth, connecting ribs, and mounting plate, all composed of substantially the same material bound firmly together by the inherent characteristic of a plastic material to adhere to material having the same general composition, shown in Fig. 8.

From the foregoing, it is apparent that by the present invention, there is provided an improved method of and apparatus for mounting artificial teeth characterized by the initial production of groups of teeth connected together by a material similar to that of which the teeth are composed, so that the teeth can be readily used in the completion of try-ins with a minimum of handling and assurance that the teeth will maintain proper occlusion. Furthermore, the present invention is also characterized by the production of dentures for use in the mouth, whereby the several groups of teeth, as used in a try-in, are incorporated in a denture made of a material similar to the material employed for the teeth mounted on the denture, as well as the material connecting the teeth, so that the completed denture provides a substantially homogeneous assembly of teeth, the connections therebetween, and the plate portion which fits in the mouth.

I claim:

1. A step in the production of artificial teeth for mounting in an articulator employing a wax plate from a cast of the mouth, which step consists in molding individual teeth from a plastic material accompanied by the connecting together of the rear faces of certain of said teeth by ribs composed of the same material.

2. A step in the production of artificial teeth for mounting in an articulator employing a wax plate from a cast of the mouth, which step consists in the formation of individual teeth in a molding die from plastic material, accompanied by the connection of the rear faces of certain of said teeth by ribs composed of the same material, whereby groups of selected teeth are removable from the molding die as units.

3. A denture comprising a group of separate artificial teeth composed of moldable material, with the members of the group being connected together by transverse ribs composed of the same moldable material of which the teeth are composed and a plate for use in the mouth made of a moldable material similar to that employed for the teeth and their connecting ribs.

4. A denture comprising a plurality of groups of separate artificial teeth composed of plastic material, with the members of each group being connected together by transverse ribs composed of the same plastic material of which the teeth are composed and a plate for use in the mouth made of a plastic material similar to that employed for the teeth and their connections, with all portions of the complete denture being held together by the inherent adhesiveness of the plastic material to form a substantially homogeneous assembly of teeth, connecting ribs and plate.

EUGENE J. VAILLANCOURT.

References Cited in the file of this patent

UNITED STATES PATENTS

| Number | Name | Date |
|---|---|---|
| 522,400 | Bowlus | July 3, 1894 |
| 2,230,164 | Myerson | Jan. 28, 1941 |
| 2,279,067 | Shapiro | Apr. 7, 1942 |
| 2,367,767 | Gale | Jan. 23, 1945 |
| 2,419,248 | Blanchard | Apr. 22, 1947 |